United States Patent
Stearns et al.

(10) Patent No.: US 8,661,966 B2
(45) Date of Patent: *Mar. 4, 2014

(54) APPARATUS FOR PREPARING A HEATED FLAVORED BEVERAGE

(75) Inventors: Wayne R. Stearns, Woodinville, WA (US); Ray A. Ross, Redmond, WA (US); David E. Isett, Bellevue, WA (US)

(73) Assignee: Concordia Coffee Company, Inc., Bellevue, WA (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/397,918

(22) Filed: Mar. 4, 2009

(65) Prior Publication Data

US 2009/0158937 A1 Jun. 25, 2009

Related U.S. Application Data

(62) Division of application No. 11/150,554, filed on Jun. 10, 2005, now Pat. No. 7,507,430.

(51) Int. Cl.
*A47J 31/00* (2006.01)
*A01K 43/00* (2006.01)

(52) U.S. Cl.
USPC ................ 99/279; 99/280; 99/323.3; 99/290; 99/286; 99/293; 426/231; 426/511; 426/433; 426/590; 426/506

(58) Field of Classification Search
USPC ........... 99/280, 323, 290, 286, 279, 285, 287, 99/293, 294, 299, 300, 316; 426/231, 511, 426/433, 506, 474, 477, 590–598
See application file for complete search history.

(56) References Cited

U.S. PATENT DOCUMENTS

| | | | |
|---|---|---|---|
| 2,733,731 A | 2/1956 | Turak | |
| 4,438,683 A * | 3/1984 | Bartfield | 99/330 |
| 5,033,645 A | 7/1991 | Shannon | |
| 5,056,686 A * | 10/1991 | Jarrett | 222/129.2 |
| 5,207,148 A * | 5/1993 | Anderson et al. | 99/281 |
| 5,341,957 A * | 8/1994 | Sizemore | 222/2 |
| 5,423,245 A | 6/1995 | Midden | |
| 5,473,909 A * | 12/1995 | Kateman et al. | 62/306 |
| 6,099,878 A * | 8/2000 | Arksey | 426/231 |
| 7,021,206 B2 | 4/2006 | Eckenhausen | |
| 7,147,131 B2 | 12/2006 | Sher | |
| 7,507,430 B2 * | 3/2009 | Stearns et al. | 426/474 |
| 2003/0232115 A1 * | 12/2003 | Eckenhausen et al. | 426/477 |
| 2004/0168465 A1 | 9/2004 | Renken | |

* cited by examiner

*Primary Examiner* — Henry Yuen
*Assistant Examiner* — Ket D Dang
(74) *Attorney, Agent, or Firm* — Christensen O'Connor Johnson Kindness PLLC

(57) ABSTRACT

An automated hot beverage dispensing machine and method for producing hot beverages is disclosed. The preferred apparatus includes a plurality of flavoring reservoirs connected through pumps and valves to a plenum that dispenses the flavoring directly into a mixing chamber. The mixing chamber also receives milk and steam, facilitating mixing of the milk, steam, and flavoring, and dispensing the mixture into a serving cup. The dispensing machine may include a coffee brewing system, whereby the machine can produce flavored lattés, cappuccinos, and the like. In the preferred embodiment, pressurized steam is directed through a venturi assembly that draws in refrigerated milk and ambient air and delivers the fluids to a vortex mixer to produce steamed and/or foamed milk. The flavoring is delivered to the vortex mixer, and steam is channeled to the plenum to facilitate delivery of the flavoring and maintain the cleanliness of the plenum.

11 Claims, 8 Drawing Sheets

US 8,661,966 B2

APPARATUS FOR PREPARING A HEATED FLAVORED BEVERAGE

CROSS-REFERENCE TO RELATED APPLICATION

This application is a division of U.S. application Ser. No. 11/150,554, filed Jun. 10, 2005, which is now issued as U.S. Pat. No. 7,507,430.

FIELD OF THE INVENTION

The present invention relates to automated drink machines and, more particularly, to automated drink dispensing machines that incorporate steamed and/or foamed milk.

BACKGROUND OF THE INVENTION

Automated hot drink dispensing machines, and particularly those that incorporate steamed and/or foamed milk with or without coffee drinks, such as cappuccinos and lattes, are known. A particular example of one such machine is disclosed in U.S. Pat. No. 5,207,148, to Anderson et al., which is hereby incorporated by reference. Such machines, however, have not included the capability to dispense a variety of different syrups, sauces and/or other flavorings into either a steamed milk stream or a latte or cappuccino. In today's market, the demand for flavored drinks is increasing; therefore, an automated machine that incorporates this capability is desired.

When flavorings are added to beverages, even in manually operated coffee machines, flavored syrups and other flavorings are typically added to the beverage either before the addition of the heated fluid (e.g., the coffee liquor and/or steamed milk) or after the addition of the heated fluid. It has been found to be desirable, however, to add such flavoring during the heating process, for example, to promote partial caramelization of the sugars in the flavorings.

Also, it is often desirable in coffee and steamed/foamed milk drinks to add the flavoring to the milk rather than to the coffee liquor. For example, in mocha cappuccinos, the addition of the chocolate flavoring into the steamed and/or foamed milk prior to addition of the coffee liquor can produce a visually attractive layered beverage with a chocolate-colored foam milk layer, wherein the chocolate flavoring is concentrated in the milk layer(s) of the beverage.

There is a need, therefore, for an automated hot beverage machine wherein a flavoring is added prior to or during the heating of the beverages and/or wherein a flavoring is added to the milk portion of the beverage.

SUMMARY OF THE INVENTION

An apparatus and a method for automatically dispensing a flavoring such as a syrup into a beverage, such as steamed milk, a cappuccino, or a latté, are disclosed. The apparatus includes a pump having a milk inlet that draws milk from a milk reservoir and an outlet. A steam supply is fluidly coupled to the outlet such that the milk can be steamed and/or frothed. A mixing chamber receives the milk and steam through an inlet coupled to the outlet of the pump. The mixing chamber includes a dispensing outlet. A plurality of flavoring reservoirs are provided, each flavoring reservoir having an outlet fluidly coupled to the mixing chamber and a control valve for controlling the flow of syrup from the syrup supply to the mixing chamber. The steam supply is coupled to the syrup supply between the control valve and the mixing chamber. The latter is activated to purge and cleanse the syrup supply downstream of the valve after the syrup has been dispensed.

In an embodiment of the invention, the pump is a venturi-type pump that is driven by steam flow through the venturi to draw milk from the milk reservoir.

In another aspect, the present invention includes a method for preparing a flavored drink comprising the steps of initiating a flow of steam and milk into a mixing chamber, initiating syrup flow into the mixing chamber through a syrup passageway, allowing at least a portion of the milk and syrup to exit the mixing chamber, and ceasing the syrup flow into the mixing chamber, ceasing flow of steam and milk into the mixing chamber, and preferably, thereafter, injecting steam into the syrup passageway to clear the passageway of residual syrup.

In an aspect of the invention, a method is disclosed for preparing a heated, flavored beverage wherein a flow of steam and milk is initiated into a mixing chamber a flow of flavoring is also initiated into the mixing chamber. The milk, steam, and flavoring exit the mixing chamber into a serving container and the fluid flows are ended.

In an embodiment of the invention, steam flow is also provided through the passageway that transports the flavoring to the mixing chamber to facilitate flow of the flavoring.

In an embodiment of the invention, steam flow through the flavoring passageway is provided after the flavoring flow has ceased, thereby clearing the passageway of residual flavoring.

In an embodiment of the invention, a plurality of flavoring reservoirs are individually selectable.

In an embodiment of the invention, an apparatus for producing the beverage includes a pump—for example, a venturi pump—that receives steam through a first inlet and draws in milk from a refrigerated source through a second inlet. The steamed milk and steam are output to a mixing chamber that is fluidly connected to the pump and thence through a dispensing outlet. A plurality of flavoring reservoirs is provided for selectively dispensing flavoring to the mixing chamber.

In an embodiment of the invention, the flavoring reservoirs are fluidly connected to the mixing chamber through a plenum disposed between the flavoring reservoirs and the mixing chamber and the plenum includes a steam inlet.

In an embodiment of the invention, the apparatus includes a coffee brewer assembly with a dispensing outlet positioned adjacent the dispensing outlet from the mixing chamber.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings, wherein.

DETAILED DESCRIPTION OF THE PREFERRED EMBODIMENT

Figure 1:
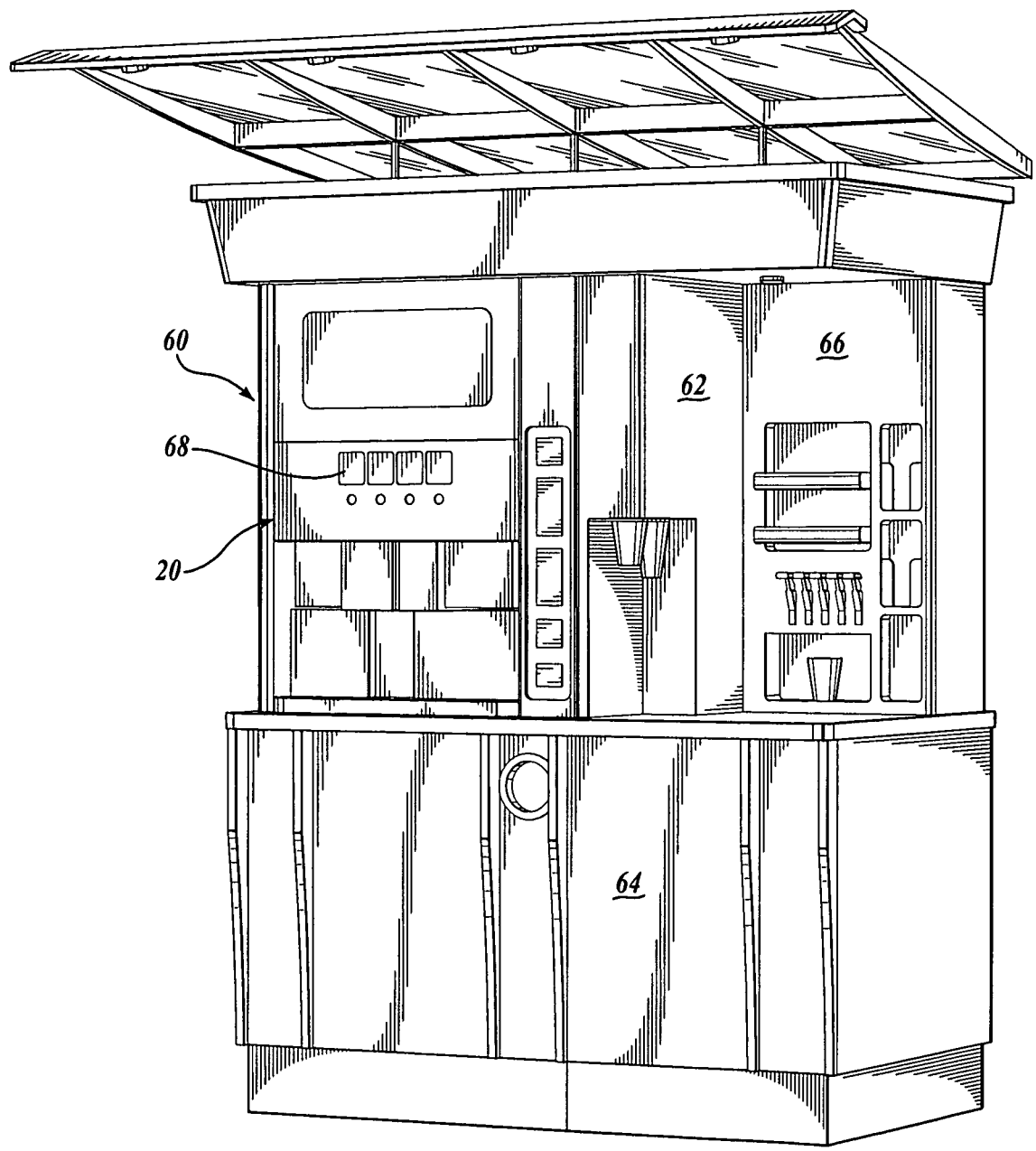
FIG. 1 is an environmental view of the automated hot drink dispensing machine of the present invention showing the apparatus installed in a kiosk.

In order to assist the reader in understanding the present invention, a currently preferred embodiment of the invention will now be described with reference to the figures, wherein like numbers indicate like parts. Referring first to FIG. 1, an embodiment of an automated hot beverage dispensing machine made in accordance with the present invention and subsequently referred to herein as an espresso machine 20, is shown. It will be appreciated that the present invention may be practiced in hot beverage machines other than espresso machines, including, for example, hot cocoa machines and the like. In this exemplary embodiment, the espresso machine 20 is disposed in a kiosk 60 that may include, for example, a cup dispenser area 62, a supply dispenser area 66, and a pedestal portion 64 that may include a lockable storage area. The espresso machine 20 includes a set of user selection controls 68 that permits the user to select the type and certain qualities of the beverage to be dispensed. Although in this preferred embodiment the espresso machine 20 may be conveniently housed in the kiosk 60 within which the various components described herein are disposed, the espresso machine 20 may alternatively be housed, for example, as a component in a larger food service facility or as a smaller portable hot beverage service system.

Figure 2:
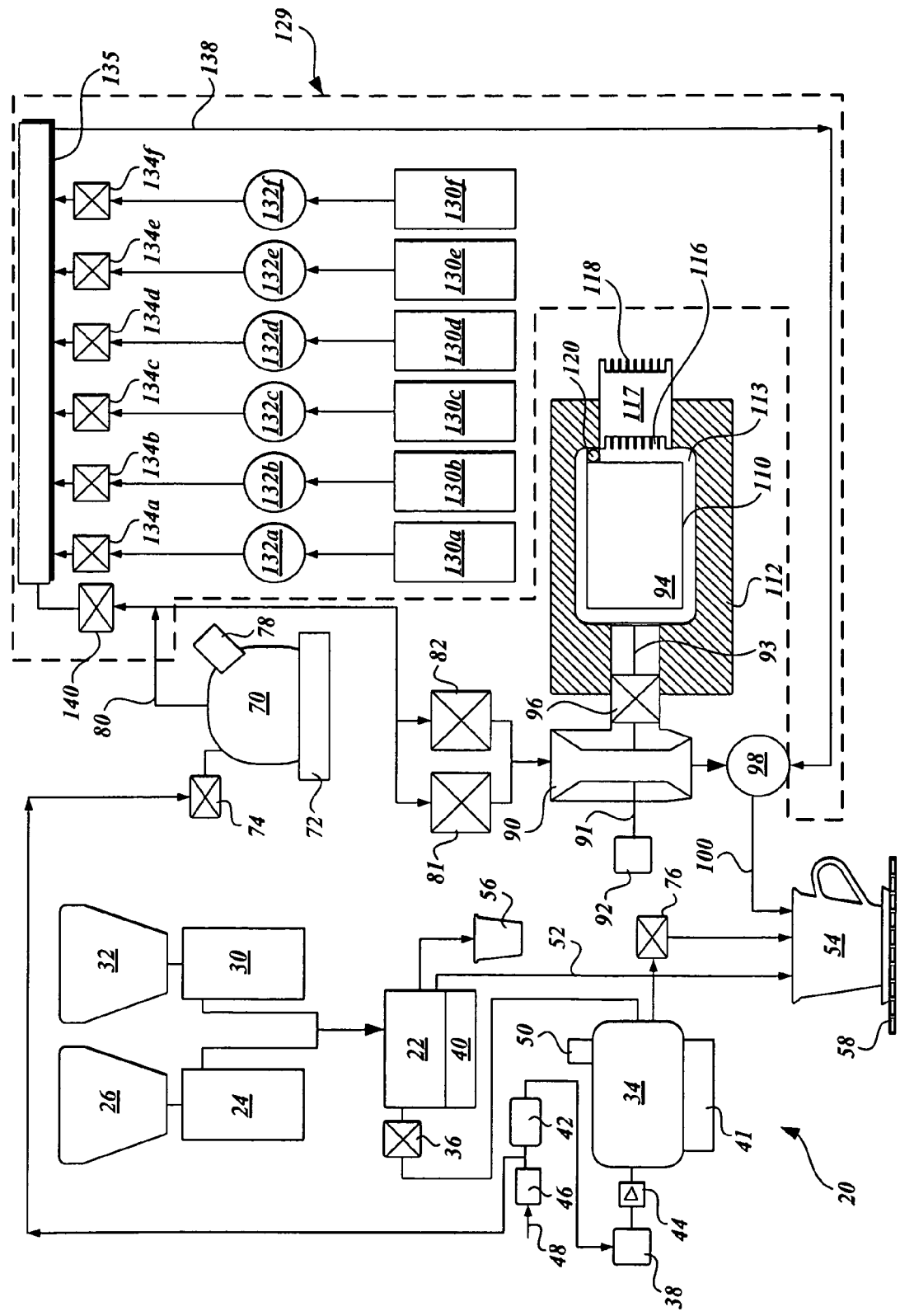
FIG. 2 is a schematic of the hot drink dispensing machine of the present invention.

Referring now to FIG. 2, a schematic diagram of the espresso machine 20 is shown. In the currently preferred embodiment, the espresso machine 20 includes a first hopper 26 and a second hopper 32. For example, the first hopper 26 may be filled with "regular" coffee beans and the second hopper 32 filled with "decaf" coffee beans. The first hopper 26 and second hopper 32 provide beans to a first grinder assembly 24 and a second grinder assembly 30, respectively. A brewer assembly 22 is provided that may be any conventional brewer as is known in the art. The brewer assembly 22 receives a measured charge of ground coffee from the first grinder assembly 24 and/or the second grinder assembly 30.

The brewer assembly 22 typically has a brewing cylinder into which the measured charge of ground coffee is selectively received and a piston or plunger that compresses the dispensed coffee grounds by operation of an electric motor. Hot brewing water is supplied at high pressure from a water heater vessel 34 through a solenoid-operated brew water valve 36. A flow meter 38 (for example, a turbine-type flow meter) generates an electrical signal indicating the quantity of water flow into the water heater vessel 34 and hence into the brewer assembly 22 and forced through the packed coffee, the electrical signal being utilized to determine when to close the valve 36, e.g., when the desired amount of pressurized hot water has traversed the flow meter 38.

In accordance with a presently preferred set of brewing parameters, a brewer heater 40 maintains the brewing cylinder at a temperature of approximately 185° F.; a water heater 41 maintains the water in the vessel 34 at a temperature of about 190° F.; a pressure of 130 psi is achieved with a high-pressure pump 42 and a check valve 44.

The hot brewing water metered through the solenoid valve 36 is provided to the brewer assembly 22 and through the coffee pack (not shown). At the end of the brewing phase, the spent grounds are ejected into a waste receptacle 56. In a preferred embodiment, a cleaning cycle may subsequently be engaged wherein the brewer assembly 22 and the line 52 are flushed with a charge of hot water through the valve 36. The hot water passes through a grate 58 into a receptacle (not shown). A separate hot water outlet valve 76 is provided for dispensing hot water on demand—for example, for tea or cleaning purposes or the like.

For making steamed milk inclusive espresso beverages, a steam generator vessel 70 is provided with an electric heater 72 to heat water in the vessel 70 to a temperature of about, for example, 240° F., at a pressure of about 14 psi, or approximately one atmosphere, gage pressure. Water from the supply 48 is provided through a solenoid-actuated inlet valve 74. A mechanical safety relief valve 78 affixed through the wall of vessel 70 releases steam pressure if it inadvertently exceeds approximately 30 psi. An outlet line 80 carries steam from the vessel 70 through either or both first and second solenoid valves 81, 82 to a steam-driven venturi pump 90. Although a venturi pump 90 is used in the preferred embodiment, it will be readily apparent that other pumping systems known in the art may alternatively be used without departing from the present invention. For example, a system for aerating milk for beverages that uses separate milk pumps and air inlet orifices is disclosed in U.S. Pat. No. 6,099,878, which is hereby incorporated by reference in its entirety.

In this embodiment, steam flow through the pump 90 draws ambient air through a valve 92 and an orifice 91 in the pump 90 and draws liquid milk through a flexible output tube 93 from a refrigerated milk supply 94 by means of a solenoid valve 96. In a preferred embodiment, the first steam valve 81 has a different flow rate than the second steam valve 82 and may be considered the "latté" control, while the second steam valve 82 is utilized when "cappuccino" is to be prepared. It will be readily apparent that other equivalent valve constructions may be utilized without departing from the present invention. For example, the first and second valves 81, 82 could alternatively be implemented as a single three-way valve that selectively provides low or high steam flow rates.

The pump 90 is connected to a mixer 98—for example a vortex mixer. The mixer 98 blends the received mix of air, steam, and milk into a foam and/or steamed milk mixture that is delivered directly to the serving cup 54 through a steamed milk tube 100.

The refrigerated milk supply 94 is disposed in a milk vessel 110 that is disposed within an insulated housing 112 that may include a peripheral air flow passage 113. A refrigeration mechanism—for example, a Peltier effect device 117—is disposed as shown with a "cold" surface inside the housing and a "hot" surface outside. Heat from the passage 113 is carried through a set of heat exchanging fins 116 within the housing through the set of Peltier thermoelectric chips 117 and to a set of external heat exchanging fins 118. The heat transfer rate may be improved, such that the temperature gradient in the milk supply 94 is reduced, by using a small electric blower 120 fluidly connected to the passage 113 to augment the natural convection flow by forcing additional air flow over the fins 116 and around the milk vessel through the passage 113.

A flavoring dispenser assembly 129, indicated by the dashed-line enclosure, includes a plurality of flavoring reservoirs (six shown) 130a, 130b, 130c, 130d, 130e, and 130f (hereinafter "130a-130f"). Hot beverage and coffee flavorings, for example, flavoring syrups, are known in the art and come in many different varieties, including, for example, vanilla, Irish crème, almond, rum, orange, hazelnut, mint, and the like. Chocolate syrups are particularly popular for creating hot cocoa drinks and mocha coffee drinks. One or more of the flavorings may be sauces, for example a chocolate sauce. When "syrup" is used herein, it should be understood to encompass other flavorings, including sauces. In the current embodiment of the present invention, each of the flavoring reservoirs 130a-130f is fluidly connected to a respective pump 132a-132f. Each of the pumps 132a-132f is individually controllable. The downstream side of each of the pumps 132a-132f is connected to a respective valve 134a-134f. Each of the valves 134a-134f is fluidly connected to a plenum 135 that provides a flow path 138 directly into the vortex mixer 98 discussed above. The outlet line 80 provides a flow path from the steam generator vessel 70 to a steam valve 140 such that steam can be selectively provided to the plenum 135 to facilitate the transport of the selected flavoring from the plenum 135 to the vortex mixer 98 while also promoting the full discharge of the flavoring, precluding any build-up or retention of flavoring in the plenum 135.

It will also be appreciated that the selected flavoring is discharged into the vortex mixer 98, which also receives and foams the mix of air, steam, and milk. This provides two clear benefits—first, the flavoring is heated by the steam received in the vortex mixer 98, thereby facilitating caramelization of the flavoring; and second, the flavoring is mixed with the foamed milk mixture before deposition into the serving cup 54 rather than being poured directly into, for example, the coffee fluid, thereby improving both the presentation and the flavoring of the resulting beverage.

The flavoring reservoirs 130a-130f may be any suitable containers, including, for example, bottles, polymeric bags, rigid refillable vessels, or the like. In the preferred embodiment, the flavoring reservoirs 130a-130f are disposable polymeric flexible pouches with quick connectors for easy attachment/detachment from the corresponding pumps 132a-132f. The pumps 132a-132f are individually controllable and may be of any suitable design, as are well known in the art. The pumps 132a-132f must have sufficient capacity to pump the desired quantity of flavoring, for example, the syrup, sauce or the like. It will be appreciated that various means for metering the desired amount of flavoring may be provided. Preferably, the pumps 132a-132f provide a predetermined rate of flow for the flavoring whereby the flavoring may be metered by opening the corresponding valve for a predetermined amount of time.

Figure 3:
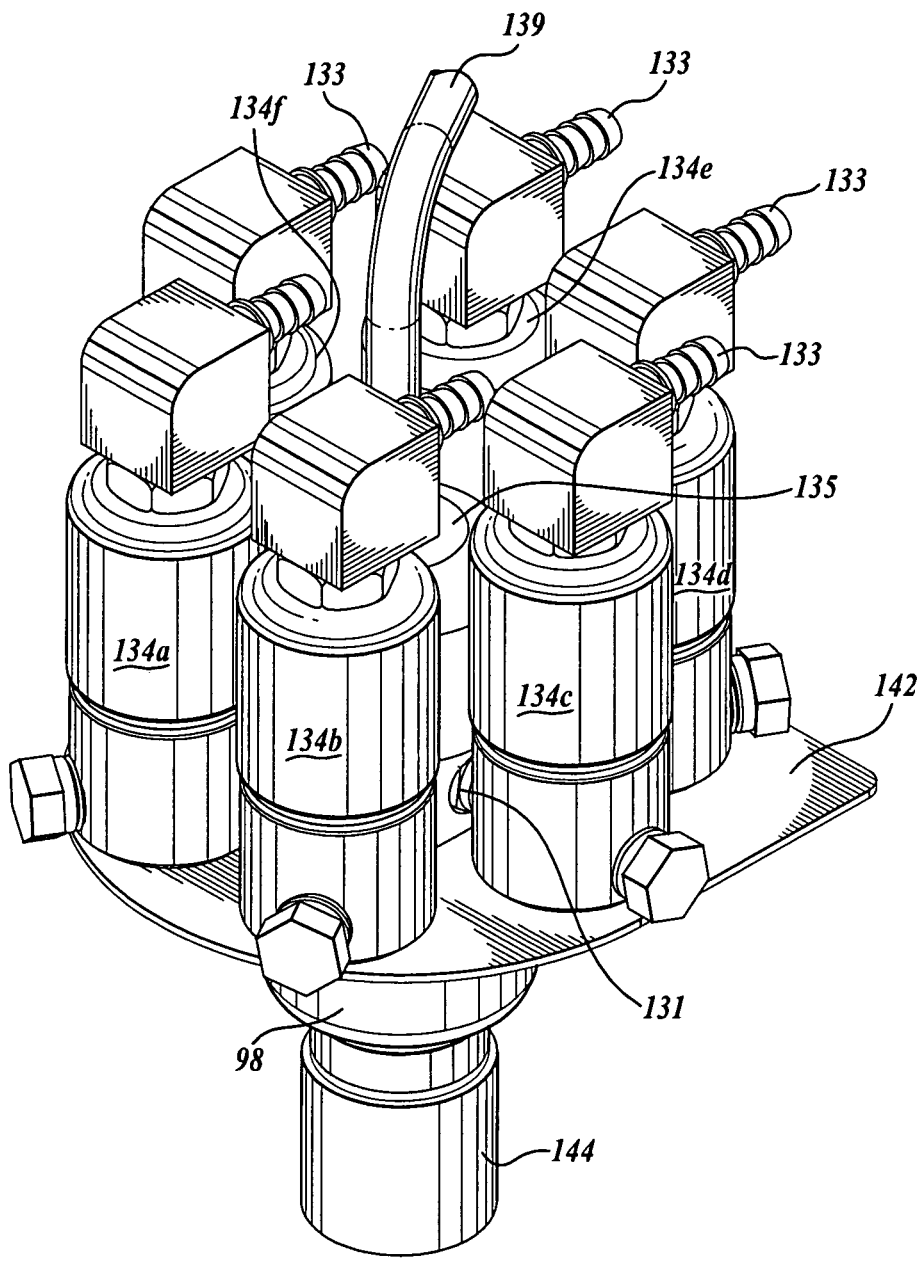
FIG. 3 is a perspective view showing a currently preferred embodiment of the flavoring valves and plenum for the automated hot drink dispensing machine shown in FIG. 1.

FIG. 3 shows the arrangement of the valves 134a-134f and a centrally located plenum 135 of the current embodiment mounted onto a perforated mounting bracket 142. The valves 134a-134f each include an upper flavoring inlet port 133 that is attachable to a flexible fluid tube (not shown) that fluidly connects the valve to its respective flavoring reservoir 130a-130f. Each of the valves 134a-134f is fluidly connected through respective outlet ports 131 (one visible in FIG. 3) to the plenum 135. As discussed above, the valves 134a-134f are individually controllable to permit selective flow of the desired flavoring to the plenum 135 and thence to the vortex mixer 98, which is mounted below the mounting bracket 142. A steam port 139 fluidly connects the plenum 135 to the steam source 70 through valve 140 (see FIG. 2) to facilitate fully dispensing the flavoring into the vortex mixer 98, sanitizing and purging the flavoring from the plenum 135. An outlet nozzle 144 overlies the serving cup 54 (FIG. 2), which receives the air/milk/steam mixture from the vortex mixer 98.

Figure 4:
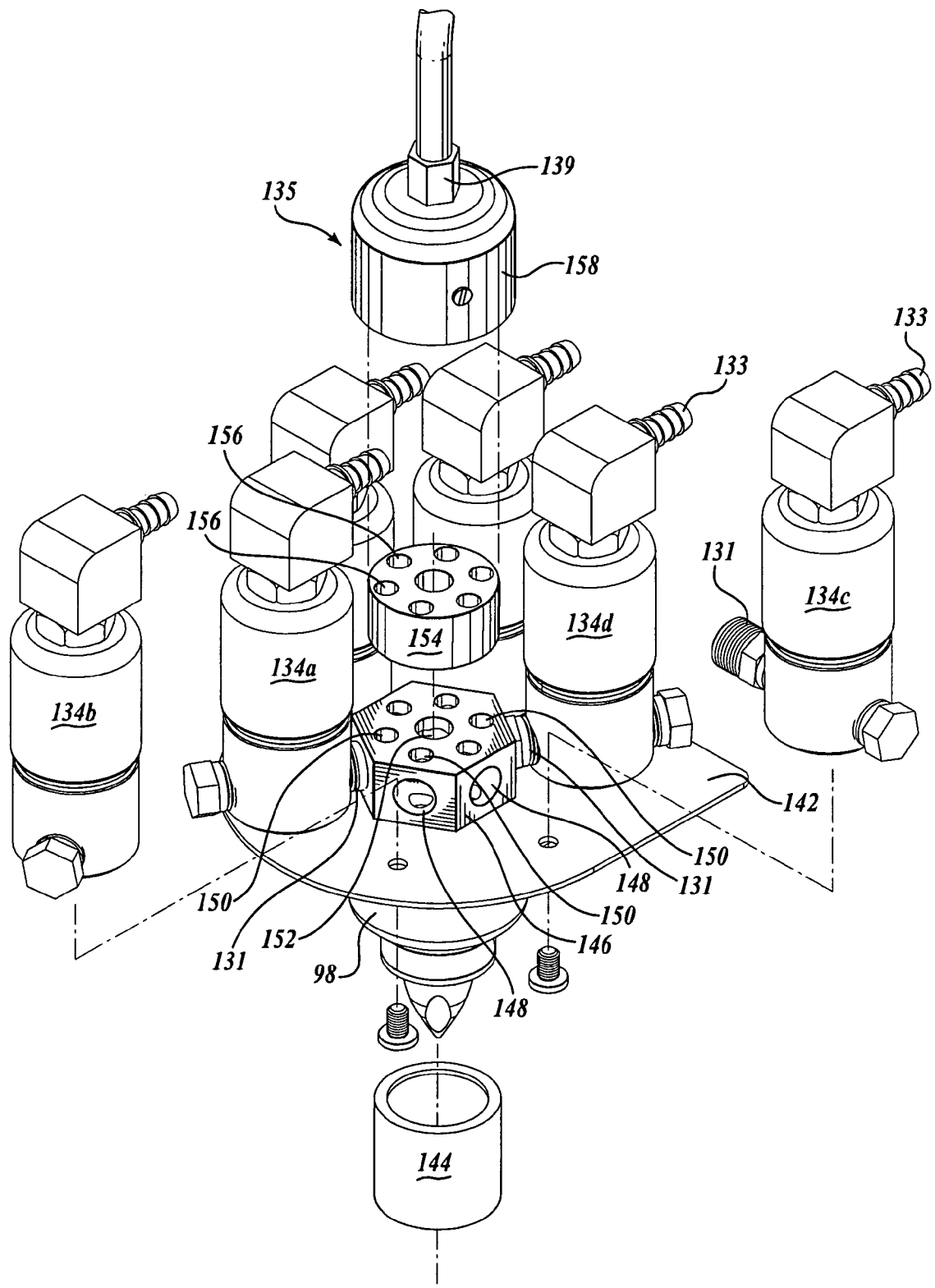
FIG. 4 is a partially exploded view of the valves and plenum shown in FIG. 3.

A partially exploded view of the arrangement of FIG. 3 is shown in FIG. 4, showing particular details of the currently preferred plenum 135. The plenum 135 includes a base portion 146 that is attached to the mounting bracket 142. The base portion 146 includes a plurality of flavoring inlet ports 148 that fluidly connect to the valve outlet ports 131. A plurality of steam ports 150 extend vertically to intersect the flavoring inlet ports 148 and extend through the base with corresponding apertures (not visible) through the mounting bracket 142 providing an inlet into the vortex mixer 98. A similar central steam port 152 is also provided. An upper portion 154 of the plenum 135 is mounted atop the base portion 146 and includes a corresponding plurality of vertical steam ports 156 that align with the steam ports 150, 152 in the base portion 146. In a preferred embodiment, alignment pins (not shown) extend upwardly from the base portion 146 and engage alignment apertures in the upper portion 154 to facilitate proper alignment of the base portion 146 and the upper portion 154.

A cap portion 158 of the plenum 135 fits over the upper portion 154, approximately abutting the base portion 146. The cap portion 158 includes the steam port 139 that receives steam from the steam generator vessel 70 (see FIG. 2), as discussed above. It will now be appreciated that the steam enters the cap portion 158 through the steam port 139 and is distributed through the vertical steam ports 156 in the upper portion 154 to the base portion 146 of the plenum 135. In particular, the steam flow through the steam port 139 is provided for a period of time after the flow of flavoring has ceased, thereby maintaining the cleanliness of the plenum 135.

Figure 5:
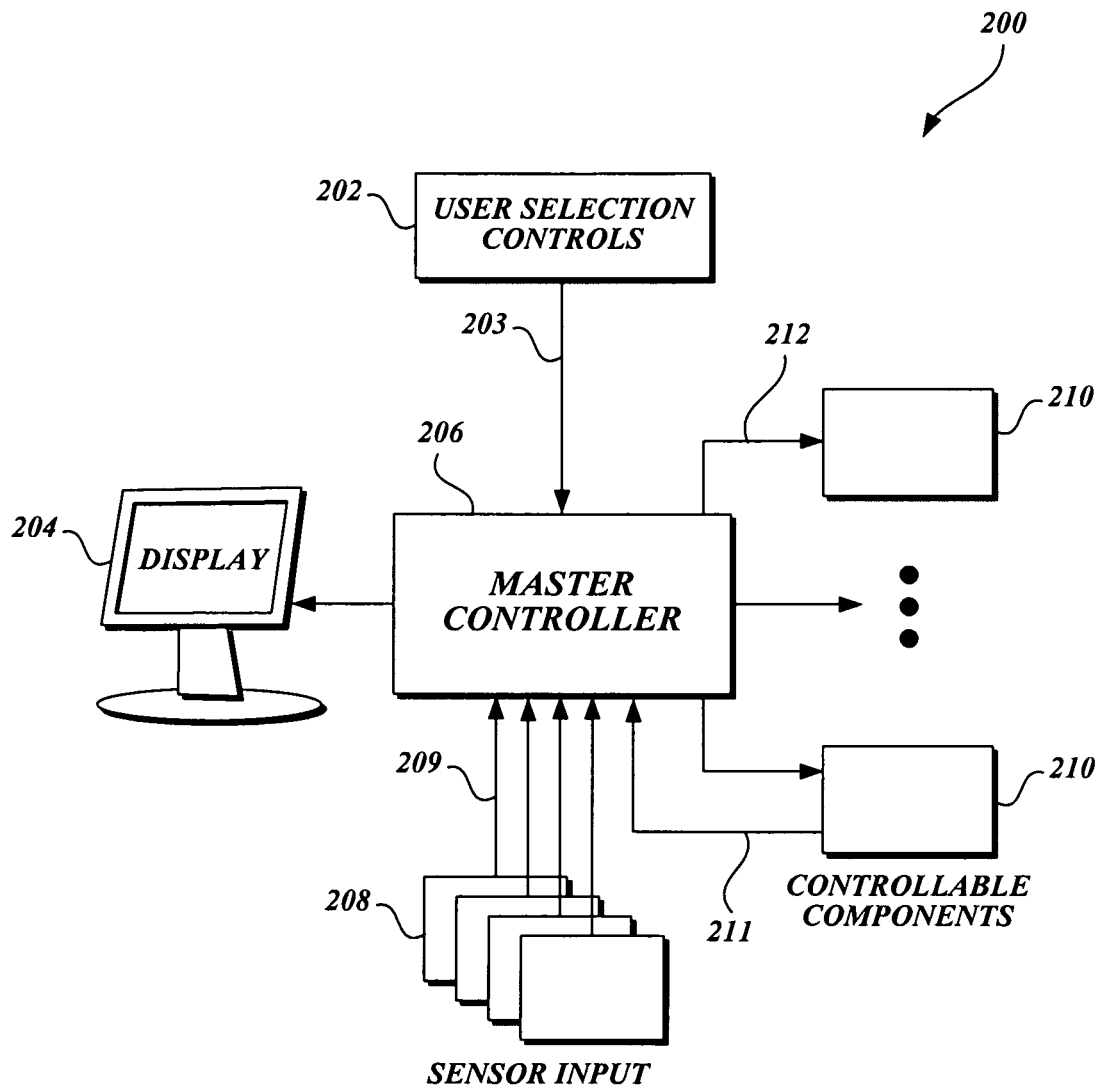
FIG. 5 is a simplified schematic representation of a control system for the automated hot drink dispensing machine shown in FIG. 1.

A simplified functional diagram of a controller system 200 for the espresso machine 20 is shown in FIG. 5. A suitable control system can clearly take many forms and may include a wide variety of functions, options, and features that are well understood in the art. In particular, the design of a specific implementation of a control system is well within the level of ordinary skill in the art. The simplified controller system 200 includes user selection controls 202, wherein a user can select the type of beverage to be produced and initiate the production cycle. The user input provides input signals 203 to a master controller 206 that is preferably a programmable, solid-state device or assembly. Typically, a display 204 is provided that provides feedback to the user regarding the selections that have been made and a visual indicator showing the progress of the production cycle. The master controller 206 additionally receives signals 209 from a plurality of sensors 208—for example, the temperature, level, and/or pressure of the fluids and/or ingredients, e.g., water, milk, flavorings, coffee and/or steam. Status signals 211 regarding the status of the various valves, pumps, and other controllable components 210 may also be provided to the master controller 206. Using the input signals 203 from the user selection controls 202 and the sensor signals 209 and/or status signals 211, the controller 206 generates a series of control signals 212 to initiate and control the cycle for producing the selected beverage.

Figure 6:
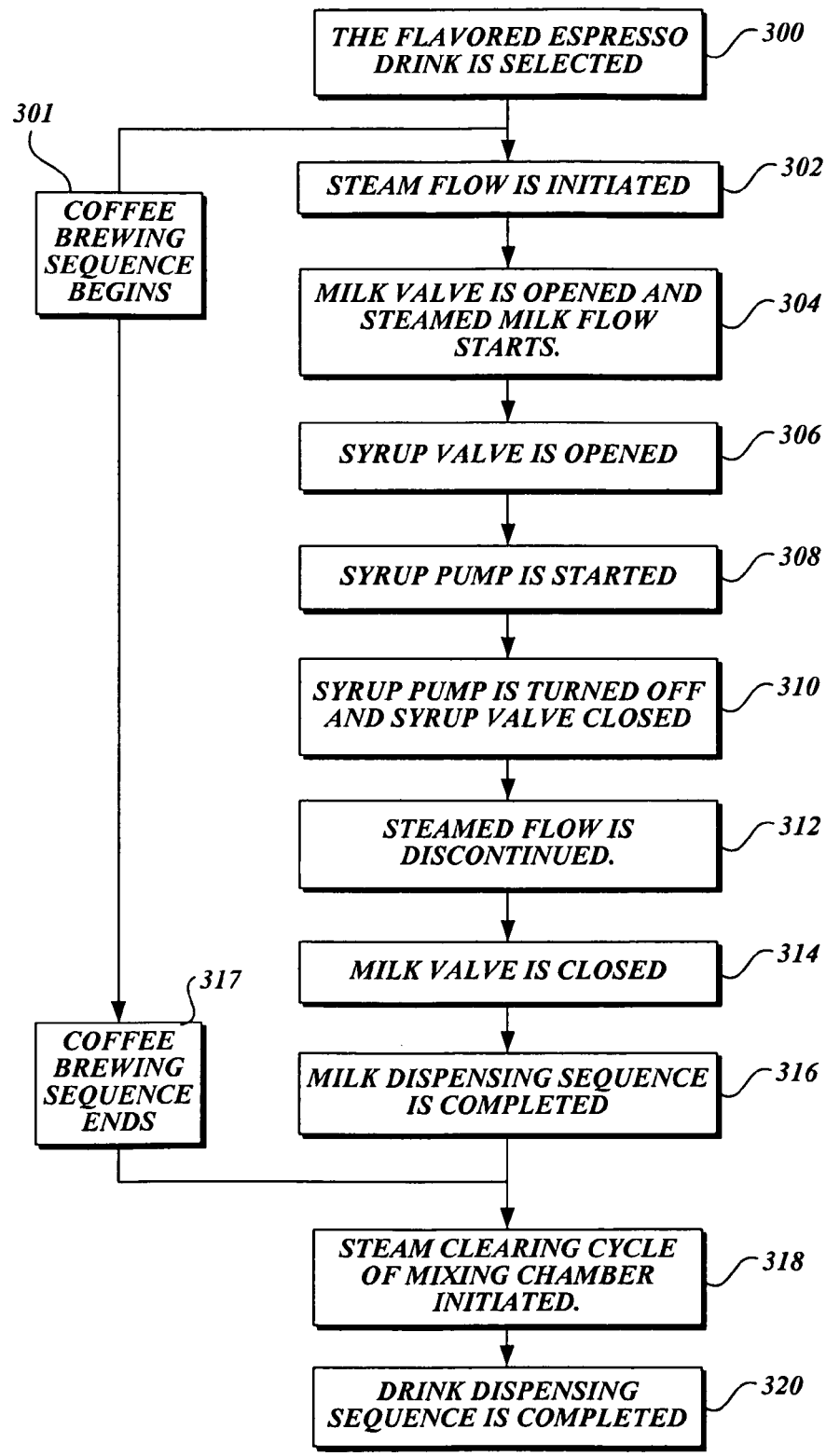
FIG. 6 is a block diagram of a particular sequence for producing a flavored latte drink in accordance with the present invention.

The operation of the espresso machine 20 for making certain beverages will now be described with reference to FIGS. 6-8. FIG. 6 shows the currently preferred sequence of steps for producing a flavored latté drink with the espresso machine 20. The user first selects the desired flavored espresso drink 300, for example, by depressing a control labeled "latte" and selecting the desired flavoring from the user selection controls 202. Under automated command from the master controller 206, the coffee brewing sequence begins 301 and the steam flow is initiated 302. It will be appreciated that the coffee brewing sequence and the milk and flavoring sequences occur in parallel to produce the desired beverage.

Automated coffee brewing sequences are well known in the art (see, for example, U.S. Pat. No. 5,207,148, which is incorporated by reference in its entirety); therefore, for brevity and clarity, the coffee brewing cycle will not be described in detail herein. Returning now to the milk and flavoring sequence, the milk flow is started 304, allowing milk to flow into the pump 90. Typically, after a brief delay, the desired flavoring syrup valve is opened 306 and the corresponding pump is started 308. After another brief delay to allow for dispensing the desired amount of flavoring, the syrup pump is turned off and the syrup valve is closed 310. The steam flow is then discontinued 312 and then the milk valve is closed 314. The milk dispensing sequence is now ended 316. The coffee brewing sequence also ends 317 and then a steam clearing cycle is initiated 318, sending steam through the pump 90, vortex mixer 98, and plenum 135, substantially expelling any remaining beverage components into the serving cup 54. The dispensing cycle is now complete 320.

Figure 7:
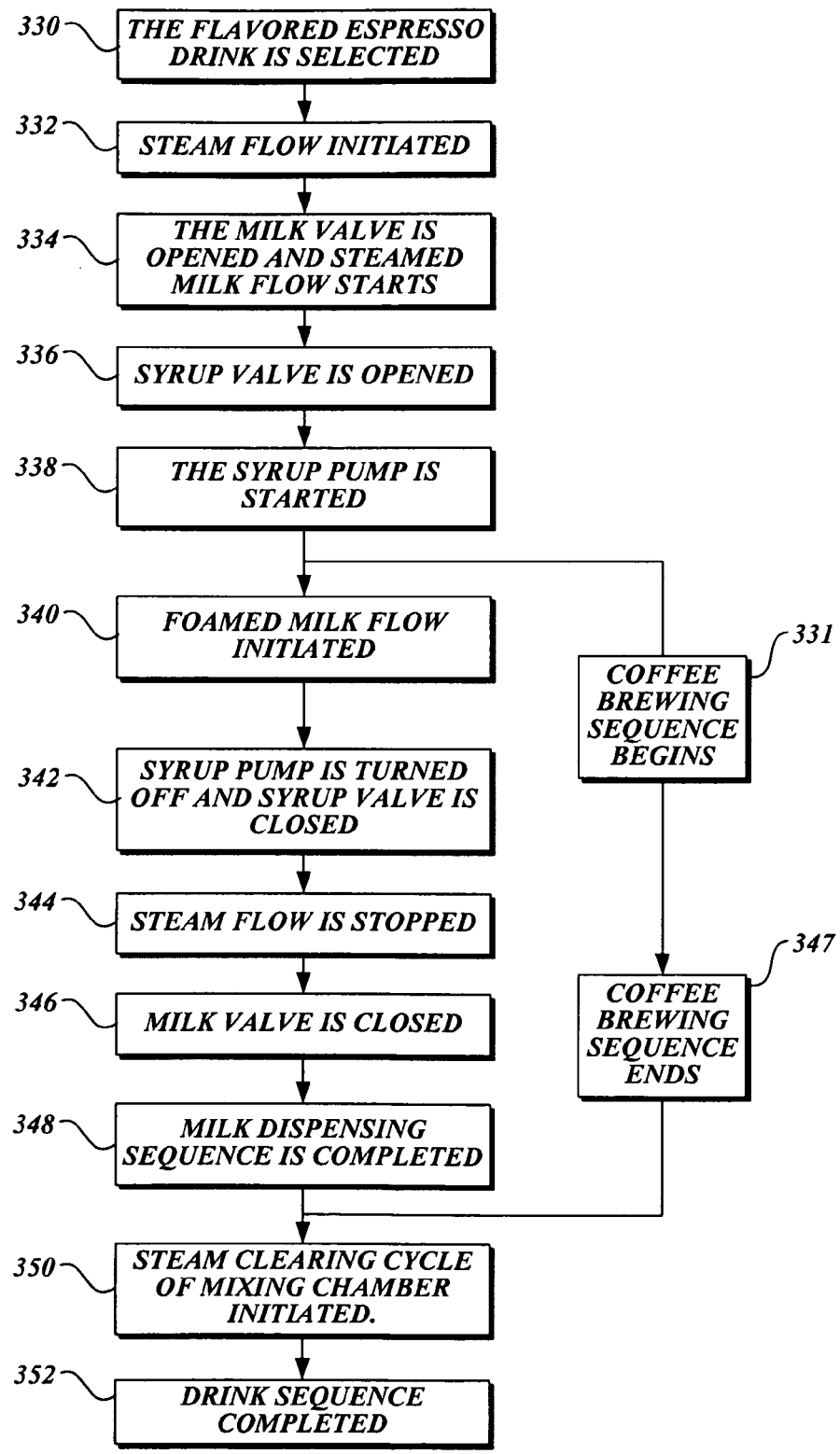
FIG. 7 is a block diagram showing a particular sequence for producing a flavored cappuccino drink in accordance with the present invention.
Figure 8:
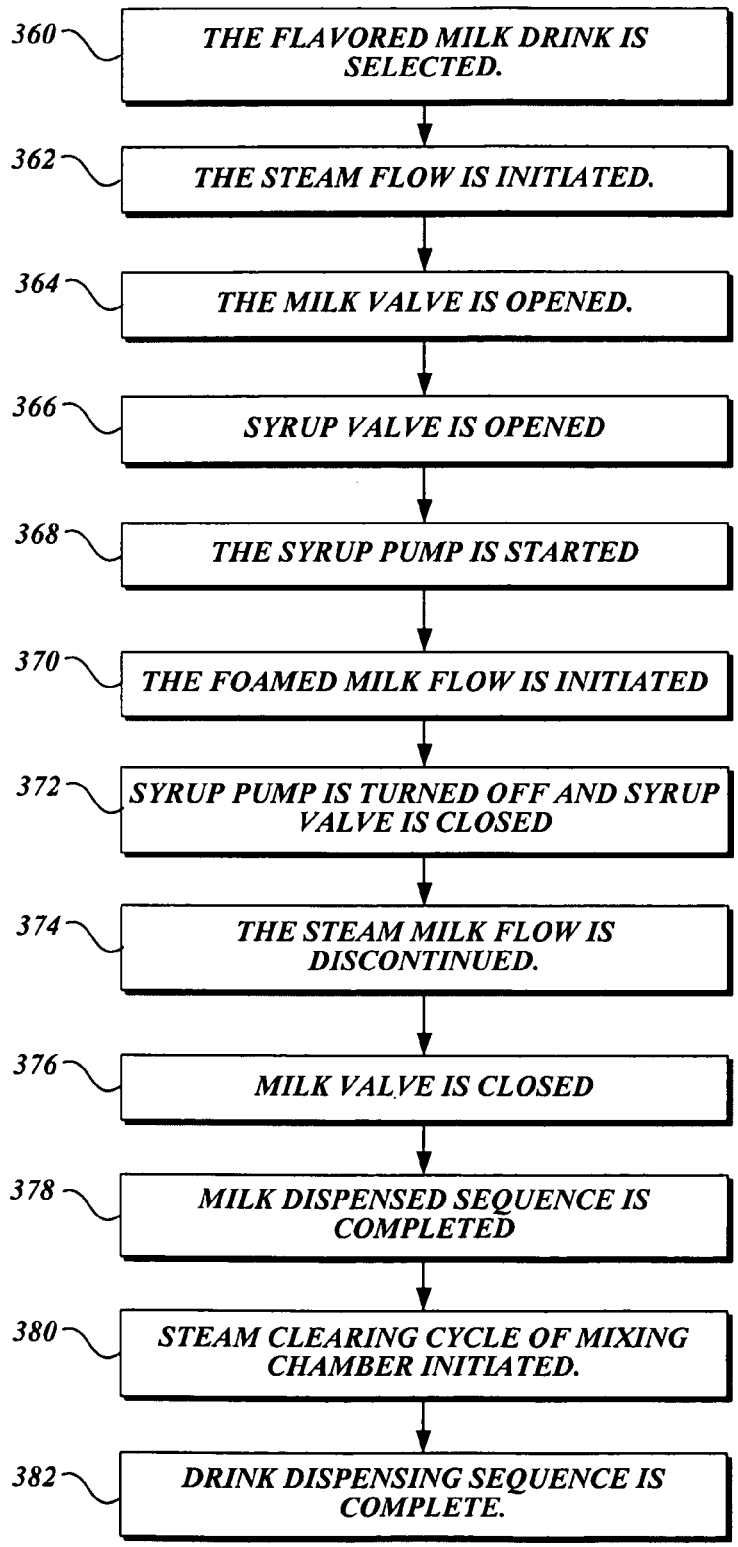
FIG. 8 is a block diagram showing a particular sequence of producing a steamed flavored milk drink in accordance with the present invention.

FIG. 7 shows the currently preferred sequence of steps for producing a flavored cappuccino drink with the espresso machine 20. The user first selects the desired flavored espresso drink 330, for example, by depressing a control labeled "cappuccino" and selecting the desired flavoring from the user selection controls 202. The steam flow is initiated 332. The milk flow is started 334, allowing milk to flow into the pump 90; and typically, after a brief delay, the desired flavoring syrup valve is opened 336 and the syrup pump is started 338. The coffee brewing sequence is also begun 331. After another brief delay to allow for dispensing the desired amount of flavoring, the foamed milk flow is started 340 by opening the larger flow rate steam valve 82 and then the syrup pump is turned off and the syrup valve is closed 342. The steam flow is then discontinued 344 and the milk valve is closed 346. The milk dispensing sequence is now completed 348. The coffee brewing sequence is also completed 347 and then a steam clearing cycle is initiated 350, sending steam through the pump 90, mixer 98, and plenum 135, substantially expelling any remaining beverage components into the serving cup 54. The dispensing cycle is now complete 352.

In the preferred embodiment, the espresso machine 20 may also be used to produce non-coffee beverages, such as hot chocolate. A typical hot chocolate sequence is shown in FIG. 8. The user first selects the desired beverage 360, for example, by depressing a control labeled "hot chocolate" from the user selection controls 202. The steam flow is initiated 362 by opening valve 81. The milk flow is started 364, allowing milk to flow into the pump 90; and typically, after a brief delay, the desired flavoring syrup valve is opened 366 and the syrup pump is started 368. After another brief delay to allow for dispensing the desired amount of flavoring, the foamed milk flow is started 370 by opening the larger flow rate steam valve 82 and then the syrup pump is turned off and the syrup valve is closed 372. The steam flow is then discontinued 374 and the milk flow is stopped 376. The milk dispensing sequence is now ended 378. A steam clearing cycle is initiated 380, sending steam through the pump 90, vortex mixer 98, and plenum 135, substantially expelling any remaining beverage components into the serving cup 54. The dispensing cycle is now complete 382.

It will be readily apparent that the drink dispensing sequences disclosed are intended to aid in the understanding of the present invention and may be modified in their details, depending on the desired drink and drink qualities to be produced. For example, it may be desirable to time the sequences for the coffee drinks such that the steamed and/or foamed milk and flavoring from the mixing chamber is delivered to the serving cup before the brewed coffee liquor is delivered to produce a desired presentation quality to the beverage. The duration of the steam clearing cycle may be selected to ensure that the milk and flavorings are fully expelled during each cycle and the components are essentially steam-cleaned.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for producing a heated, flavored beverage comprising:
   a milk pump having a milk inlet and a pump outlet;
   a refrigerated milk supply fluidly connected to the milk inlet;
   a mixing chamber having a first inlet fluidly connected to the pump outlet, a second inlet, and a first dispensing outlet;
   a steam supply fluidly connected to the first inlet;
   a plurality of liquid flavoring reservoirs, each flavoring reservoir containing a flavoring that includes a sugar, each liquid flavoring reservoir fluidly connected to the second inlet through an associated flavoring pump and an associated flavoring valve such that a selected flavoring is dispensed into the mixing chamber through the second inlet while a steam flow from the steam supply and a milk flow from the refrigerated milk supply are dispensed into the mixing chamber through the first inlet, thereby steam heating the selected flavoring with the milk flow;
   a steam valve for controlling the steam flow; and
   a plenum disposed between the plurality of liquid flavoring reservoirs and the mixing chamber;
   wherein the plurality of liquid flavoring reservoirs are fluidly connected to the mixing chamber through the plenum, and the plenum is connected to the steam supply through a steam valve such that steam can be selectively provided to the plenum to facilitate transport of liquid flavoring to the mixing chamber.

2. The apparatus of claim 1, wherein the milk pump is a venturi pump that is fluidly connected to the steam supply.

3. The apparatus of claim 2, wherein the refrigerated milk supply is connected to the milk inlet through a milk valve such that when the milk valve is opened and steam is supplied to the venturi pump, milk from the refrigerated milk supply is drawn into the milk inlet.

4. The apparatus of claim 1, further comprising:
   a coffee brewer assembly having a second dispensing outlet, the second dispensing outlet being placed adjacent the first dispensing outlet.

5. The apparatus of claim 4, wherein the coffee brewer assembly includes a coffee hopper, a coffee grinder, and a source of hot water.

6. The apparatus of claim 4, further comprising a control system comprising a user selection control and a master controller, wherein the master controller automatically controls the steam pump, the milk pump, and each flavoring pump.

7. The apparatus of claim 6, further comprising a kiosk that houses the control system, the plurality of liquid flavoring reservoirs, and the coffee brewer assembly.

8. An apparatus for producing a heated, flavored beverage comprising:
   a mixing chamber having a first dispenser;
   a milk reservoir;
   a milk pump fluidly connecting the milk reservoir to the mixing chamber;

a plurality of liquid flavoring reservoirs, each liquid flavoring reservoir containing a flavoring that includes a sugar and fluidly connected to the mixing chamber through an associated flavoring pump and an associated flavoring valve;

a steam supply fluidly connected to the mixing chamber through a steam supply valve;

user selection controls that are operable to generate command signals in response to user input; and a controller operably connected to the apparatus to receive the command signals from the user selection controls and to control the milk pump, the flavoring pumps, and the steam supply valve in response to the received command signals;

wherein the controller operates the milk pump, the flavoring pumps, and the steam supply valve such that milk from the milk reservoir and liquid flavoring from at least one of the plurality of liquid flavoring reservoirs are mixed and steam heated in the mixing chamber; and further wherein the plurality of liquid flavoring reservoirs are fluidly connected to the mixing chamber through a plenum disposed between the plurality of liquid flavoring reservoirs and the mixing chamber, and the plenum is connected to the steam supply through a steam valve such that steam can be selectively provided to the plenum to facilitate transport of liquid flavoring to the mixing chamber.

9. The apparatus of claim 8, wherein the milk pump is a venturi pump that uses steam from the steam supply to pump milk from the milk reservoir.

10. The apparatus of claim 8, wherein the plurality of liquid flavoring reservoirs comprises disposable polymeric flexible pouches with quick connectors.

11. The apparatus of claim 8, further comprising a coffee brewer assembly having a coffee dispenser disposed adjacent the first dispenser.

\* \* \* \* \*